March 18, 1952 J. W. ASHLEY ET AL 2,589,323
EXTRUDER INJECTOR COMBINATION FOR USE
IN THE ATTACHMENT OF HEELS TO SHOES
Filed Aug. 4, 1950 7 Sheets-Sheet 1

Fig.1

Inventors
John W. Ashley
James F. Leahy
By their Attorney

March 18, 1952  J. W. ASHLEY ET AL  2,589,323
EXTRUDER INJECTOR COMBINATION FOR USE
IN THE ATTACHMENT OF HEELS TO SHOES
Filed Aug. 4, 1950  7 Sheets-Sheet 5

Inventor
John W. Ashley
James F. Leahy
By their Attorney

Patented Mar. 18, 1952

2,589,323

UNITED STATES PATENT OFFICE 2,589,323

EXTRUDER INJECTOR COMBINATION FOR USE IN THE ATTACHMENT OF HEELS TO SHOES

John W. Ashley and James F. Leahy, Beverly, Mass., assignors to United Shoe Machinery Corporation, Flemington, N. J., a corporation of New Jersey Application August 4, 1950, Serial No. 177,650

5 Claims. (Cl. 18—30)

This invention relates to an extruder injector combination for use in the attachment of heels to shoes in accordance with the method disclosed in an application for United States Letters Patent Serial No. 43,046, filed August 7, 1948 in our names.

It is an object of the present invention to provide an improved extruder injector combination which is reliable and effective for use in the attachment of heels to shoes and which may be operated by an inexperienced workman without danger of its being damaged.

The illustrative extruder injector combination includes an extruder having at its outlet end a valve which is automatically closed in response to filling an injector or gun coupled to the extruder. Various features of the invention comprise air cooling means for insuring that powdered resin fed to the extruder shall be maintained in powdered form until it has been fed into a heated plasticizing section of the extruder, means for preventing the operator from starting the extruder until resin in the extruder has been plasticized by heating it to a predetermined temperature by heating units in the extruder, means for energizing the units by a circuit operating at line voltage and for automatically reducing the voltage in said circuit after the resin has been raised to said predetermined temperature, and means for shutting off said unit heating means and a screw conveyor of the extruder should the air cooling means fail to operate. The above and other features of the invention are fully disclosed in the following description and claims reference being had to the accompanying drawings which illustrate one embodiment of the invention selected for purposes of illustration.

In the accompanying drawings,

Figs. 3 and 3A show the extruder partly in section on line III—III, IIIA—IIIA of Fig. 1; Fig. 3 also showing, mostly in vertical section, an injector or gun coupled to the extruder;

The present invention is illustrated as embodied in apparatus for use in the attachment of heels 20 (Figs. 10 and 11) to prepared heel seats 21 of shoes 22 in accordance with the methods disclosed in said application Serial No. 43,046. The heel 20 has formed in its attaching face 23 a pair of cross slots 24 which are inclined to the plane of the rim 25 of said face and into which extends a passage 26 disposed heightwise of the heel and opening into a top lift receiving face 27 of the heel. The heel seat 21 of each of the shoes 22 has formed in it a plurality of undercut cavities 28 and while the heel 20 is held under heavy pressure in engagement with said heel seat, viscous resin 29 from an injector or gun 30 (Fig. 3) a nozzle 32 of which is inserted in the passage 26 of the heel, is forced through said passage and into the cross slots 24 in the heel and the undercut cavities in the heel seat of the shoe as well as into all voids existing between the heel and the shoe, said resin after it has hardened serving permanently to attach the heel to the shoe.

Figure 1:
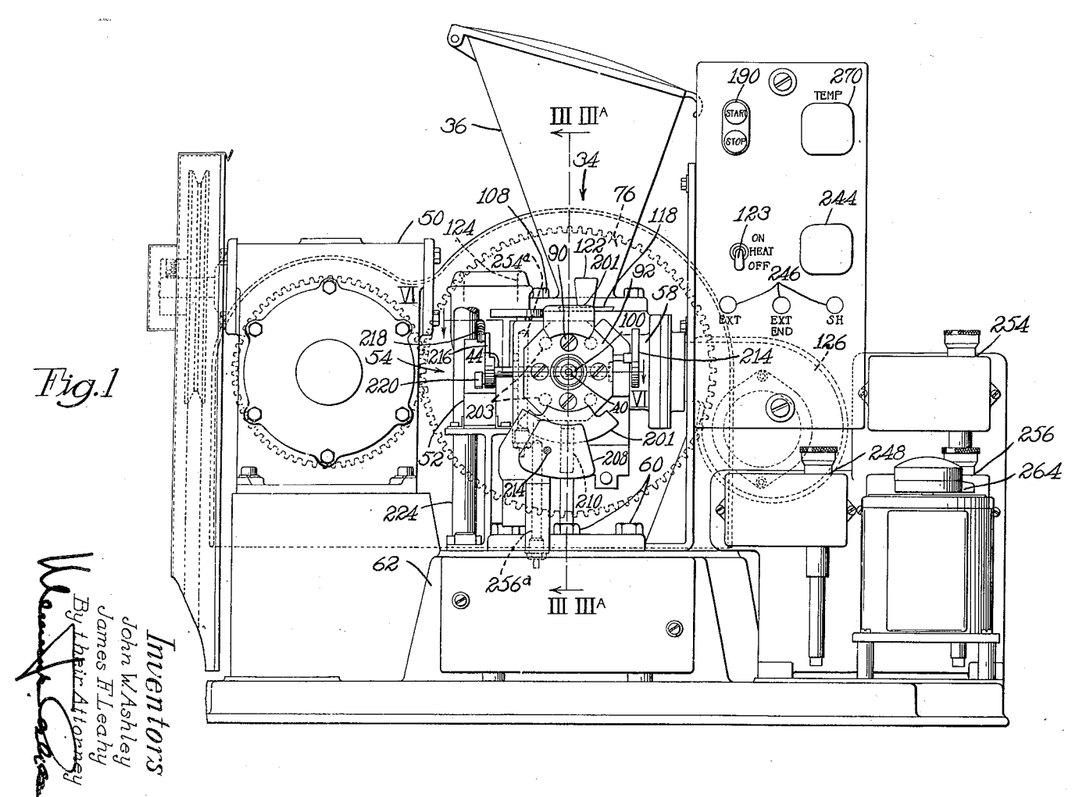
Figs. 1 and 2 are front and plan views, respectively, partly broken away, of the illustrative extruder.
Figure 6:
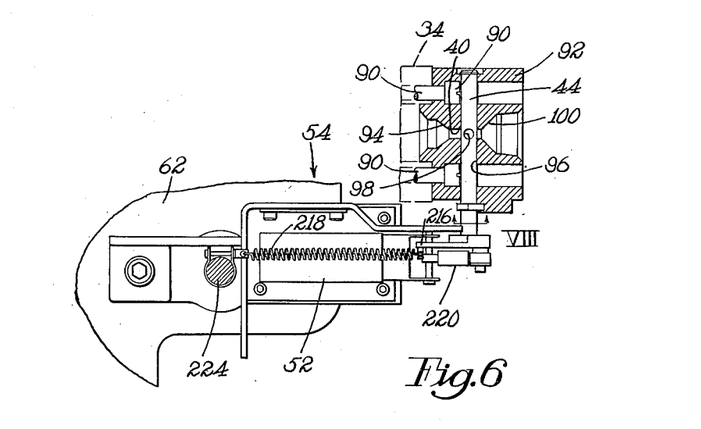
Fig. 6 is an enlarged view on line VI—VI of Fig. 1 showing valve actuating mechanism of the extruder.

The gun 30 may be quickly and effectively coupled to an extruder 34 to receive the viscous resin therefrom and is readily disconnected from the extruder preparatory to attaching the heel to the shoe, the gun serving as a dispensing device for forcing, under controlled pressure, the viscous resin into the work. As will be hereinafter explained, the extruder 34 is provided with a hopper 36 (Figs. 1, 5 and 3A) for receiving powdered resin which drops into a rear or receiving end of a passage 38 and is delivered in viscous or plasticized condition to an outlet port or passage 40 (Figs. 1, 3 and 6) of the extruder by a screw conveyor 42 (Figs. 2, 3A, 4 and 5). Arranged in the outlet port 40 of the extruder 34 is a valve 44 which controls the flow of the viscous resin from the extruder to a supply changer 46 (Fig. 3) of the gun 30, the arrangement being such that when the chamber is filled a switch or microswitch 48 (Figs. 3 and 9) is opened causing an electric motor 50 (Figs. 1, 2 and 9), which through mechanism hereinafter described operates the conveyor 42, to stop and a solenoid 52 to be energized to render spring actuated mechanism 54 (Figs. 1, 2, 6 and 7) effective to close the valve.

Various parts of the extruder 34 and the gun 30 are raised to predetermined temperatures by heaters hereinafter described to insure that the resin shall be quickly brought up to the desired temperatures and shall be maintained as nearly as practicable at such temperatures until it has been injected into the passages 26 of the heels 20 as above described. Moreover, it is desirable that the resin entering a receiving portion or section 55 of the extruder passage 38 from the hopper 36 shall remain in its powdered form until it enters a plasticizing portion or section 56 of said passage. Accordingly, as will be explained later, the receiving portion 55 of the extruder passage 38 is cooled. In order to insure that the extruder shall be effective and efficient in its operation, it is provided with various automatic controls such, for example, as means for closing the valve 44 and stopping operation of the screw conveyor 42 when the chamber 46 of the gun 30 has been filled, means for quickly raising to predetermined temperatures the resin in the extruder 34 and the gun preparatory to starting operations and for thereafter automatically sustaining said temperatures, and means for rendering inactive the above-mentioned heaters which are relied upon to plasticize the resin in the extruder whenever means for cooling the resin at the receiving portion 55 of the extruder passage 38 becomes inactive.

The illustrated extruder 34 comprises an iron casting 58 which is secured by screws 60 to a table 62. Secured by screws 64 to the rear end of the iron casting 58 is a header 66 in a bore of which is mounted a bearing 68. Fixed by a screw 70 in a horizontal bore of the iron casting 58 is an elongated tube 72 having an inner wall forming the above-mentioned cylindrical passage 38. The conveyor 42 has helical ribs 74 which engage the inner wall of the tube 72 and has mounted in splined relation upon its rear end a gear 76 held against a shoulder of the conveyor by a nut 78.

Mounted upon and secured against rotation on the tube 72 is an aluminum casting 82 (Figs. 2, 4, 5 and 3A) having at its forward portion a plurality of circular fins 84. Interposed between the aluminum casting 82 and the tube 72 on the one hand and a flange of the bearing 68 on the other hand is a circular flange 86 of the conveyor 42 and a thrust bearing 88 which is mounted upon said conveyor 42. The portions of the tube 72 extending through the aluminum and iron castings 82 and 58 respectively will be referred to as the resin receiving and plasticizing portions of the tube. As the resin becomes viscous during its flow to the left as viewed in Fig. 3A along the passage 38 of the tube 72 it is desirable to interpose between the convolutions of the helical rib 74 an additional helical rib thereby insuring that the outlet end of the tube shall be well packed under considerable pressure with viscous resin.

Figure 7:
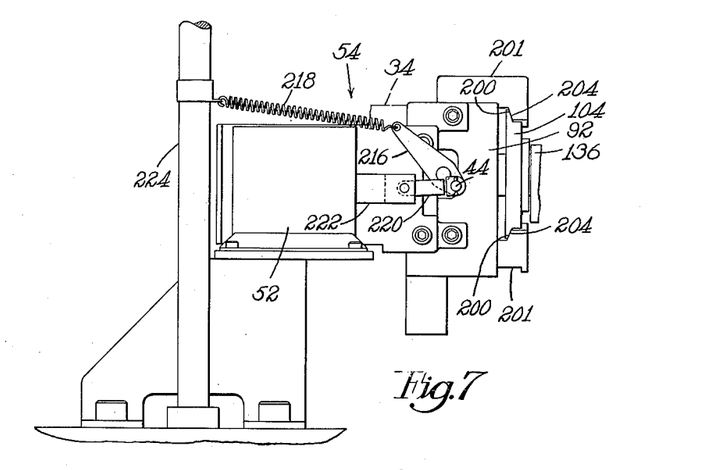
Fig. 7 shows inside elevation the valve actuating mechanism illustrated in Fig. 6.

Secured by screws 90 (Figs. 1, 3, 6 and 3A) to the iron casting 58 is an end block 92 having formed in it a frusto conical opening 94 (Figs. 3 and 6) terminating in the outlet port 40. Formed in the block 92 and passing transversely across the port 40 is a bore 96 in which is rotatable the valve 44 which has formed in it a cylindrical passage 98, said valve as above stated serving in accordance with its position to permit or to restrict flow of resin through the outlet port 40 thus rendering the extruder active and inactive respectively. The front end of the block 92 has formed in it a frusto conical face or surface 100 which is engaged by a frusto conical face or surface 102 (Fig. 3) of a coupling portion 104 (Figs. 3 and 7) of the gun 30, said gun, as will be hereinafter explained, being quickly and effectively coupled to the extruder 34 preparatory to filling the chamber 46 of the gun and thereafter being readily disconnected from the extruder preparatory to injecting the resin then in the gun into the work. The surfaces 100, 102 may be referred to as sealing portions of the end block 92 of the extruder and the coupling portion 104 of the injector respectively.

The major portion of the aluminum casting 82 is spaced from the iron casting 58 which has flat faces 106 (Figs. 2 and 5) for supporting the resin receiving hopper 36, said hopper having a pocket 107 and being secured to the iron casting by screws 108 which pass through bores in the hopper and are threaded into the iron casting 58. Formed in the aluminum casting 82 and the tube 72 are alined passages 110, 112 (Fig. 5) which are arranged in register with a hole 114 in the bottom of the hopper 36. Movable along a dovetail guideway 116 in the hopper 36 is a slide 118 (Figs. 5 and 3A) which is provided with a hole 120 and has secured to it a handle 122 for operating the slide along the said guideway to cause the hole 120 to register with the hole 114 in the bottom of the hopper thereby permitting powdered resin in the hopper to fall through the passages 110, 112 into the receiving portion of the tube 72. Preparatory to stopping the operation of the extruder 34 for any substantial period it is customary to move the slide 118 into a position in which its hole 120 is out of register with the hole 114 in the hopper thereby preventing powdered resin in the hopper from being supplied to the tube 72, resin in said receiving portion 55 of the tube usually being used up before moving a main or power switch 123 (Figs. 1, 2 and 9) to its "off" position to stop the conveyor 42 and to cut off operation of various heaters of the apparatus.

Figure 2:
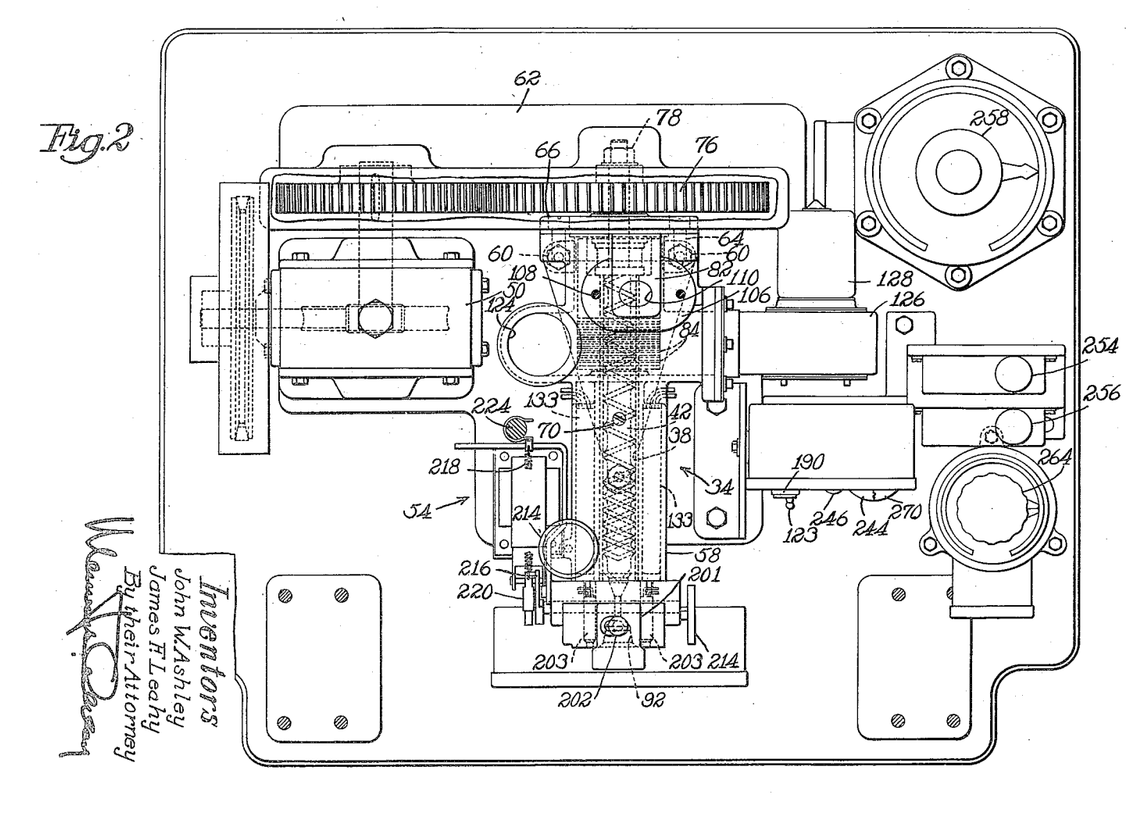
Figure 9:
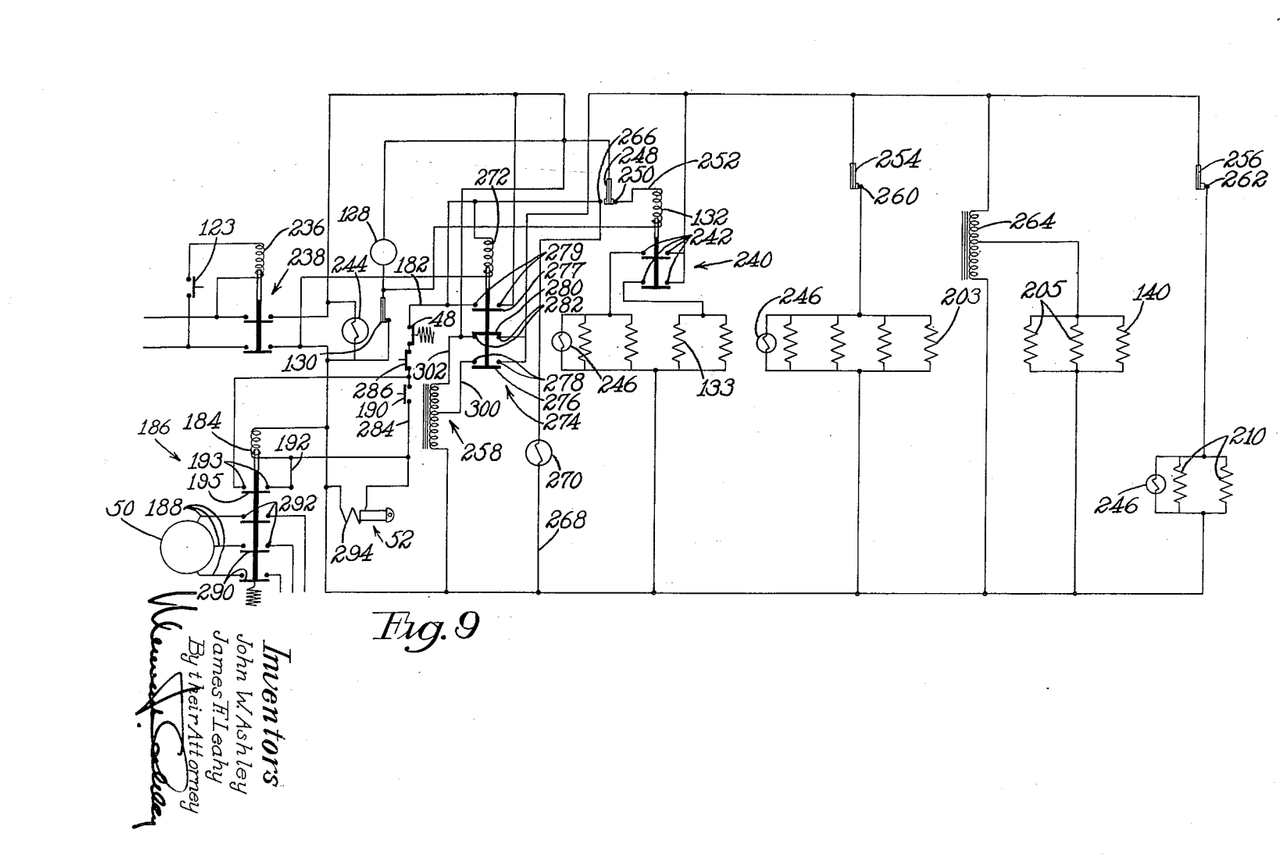
Fig. 9 shows a wiring diagram of the extruder injector combination.

It is desirable that the resin shall remain in powdered form until it reaches the rear end of the plasticizing portion 56 of the passage 38 and accordingly the aluminum 82, as above explained, is spaced from the iron casting 58 and is cooled by a current of air passing through a conduit 124 (Figs. 1, 2 and 4) in the iron casting 58 and connected to an outlet of a blower 126 driven by a motor 128 (Figs. 2 and 9). Air forced through the passage 124 in the iron casting 58 circulates around the fins 84 of the aluminum casting 82 and withdraws heat from said casting thereby insuring that the resin being delivered to the passage 38 of the tube 72 shall remain in its powdered form. If for any reason the blower motor 128 fails a switch 130 (Fig. 9) is opened with the result that a coil 132 is then deenergized and current to heaters 133 (Figs. 2, 9 and 3A) which are inserted in recesses in the iron casting 58 of the extruder 34 is cut off.

The gun 30 is similar to the gun disclosed in said application Serial No. 43,046 and when full holds a mass of resin slightly greater than that required to attach a heel to the largest shoe to be operated upon. The coupling portion 104 of the gun 30 is secured by screws 134 (Fig. 3) to a valve block 136 of the gun. The gun 30 has a steel barrel 138 the periphery of which is recessed for receiving an electric heater 140, there being secured to the barrel a casing 142 covering the heater, said barrel 138 being bored to provide the resin receiving chamber 46. Threaded onto the steel barrel 138 is an aluminum spring housing 144 having a cylindrical recess 146 and having threaded into its upper end a cap 148.

Slidingly mounted in the resin receiving chamber 46 is a hollow plunger 150 which has an enlarged flange portion 152 of suitable shape to fit slidingly in the recess 146 of the housing 144, heavy and light springs 154, 156 respectively interposed between the flange portion 152 of the plunger 150 and the cap 148 of the housing 144 serving constantly to urge the plunger into the resin receiving chamber. Threaded onto the lower end of the barrel 138 is the valve block 136 which is provided with an interrupted tapering passage 158, an upper portion of said passage being in communication with the lower end of the chamber 46 and having opening into it an intake conduit 160 which supplies viscous thermoplastic resin from the extruder. Threaded into the lower end of the valve block 136 is the above-mentioned nozzle 32 which is adapted to be inserted in the passage 26 of the heel 20 and has a passage 162 in communication with the tapered recess 158. Formed in the valve block 136 is a bore 164 serving as a bearing for a rotary valve 166 having a tapering recess 168 which may be moved into alinement with the tapering recess 158 to permit resin in the chamber 46 to be forced by the spring actuated plunger 150 through the passage 162 of the nozzle 32 or which may be moved into a position shown in Fig. 3 to stop the flow of viscous resin from the chamber 46.

The coupling portion 104 of the gun 30 has formed in it a resin inlet conduit 170, a collar 172 provided with arcuate slots 174 connecting the conduits 170 and 160 being clamped between opposing shoulders of the coupling portion 104 and the valve block 136. Slidable in a bore of the collar 172 is a valve 176 constructed and arranged to seat on a frusto conical face of the inlet conduit 170. The valve 176 is constantly urged to its closed position by a recoil spring 178 and is slid to the left as viewed in Fig. 3 against the action of said spring by the viscous resin forced from the extruder 34 into the inlet conduit 170 of the gun. As the viscous resin is forced by the extruder 34 into the chamber 46 of the gun 30 it raises the plunger 150 against the action of the springs 154, 156, the chamber continuing to fill until the upper end of the plunger engages the normally closed microswitch 48 which is secured to the cap 148 by a housing 180 thereby breaking a circuit 182 (Fig. 9) and accordingly deenergizing a coil 184 of a relay 186 to cause the opening of a circuit 188 for the extruder motor 50. In order to insure against starting the screw conveyor 42 of the extruder 34, when during the heel attaching operation the plunger 150 has moved away from the normally closed microswitch 48 and until a normally open start switch 190 has been manually actuated, a holding circuit 192 is provided. The holding circuit 192 comprises a pair of terminals 193 which once the coil 184 of the relay 186 has become deenergized are disengaged by a switch bar 195 of said relay to open said holding circuit.

Ejection of the viscous resin from the gun 30 the plunger 150 of which has been moved to a "cocked" position by the resin in the chamber 46, may be readily effected by rotating the valve 166 to an open position in which its tapering recess 168 registers with the tapering recess 158. The valve 166 is controlled through mechanism which is disclosed in detail in said application Serial No. 43,046 upon depressing a thumb actuated lever 194 to move said valve to its open position, a spring 196 being provided to move the valve to its closed position shown in Fig. 3 when said lever has been released.

Figure 3:
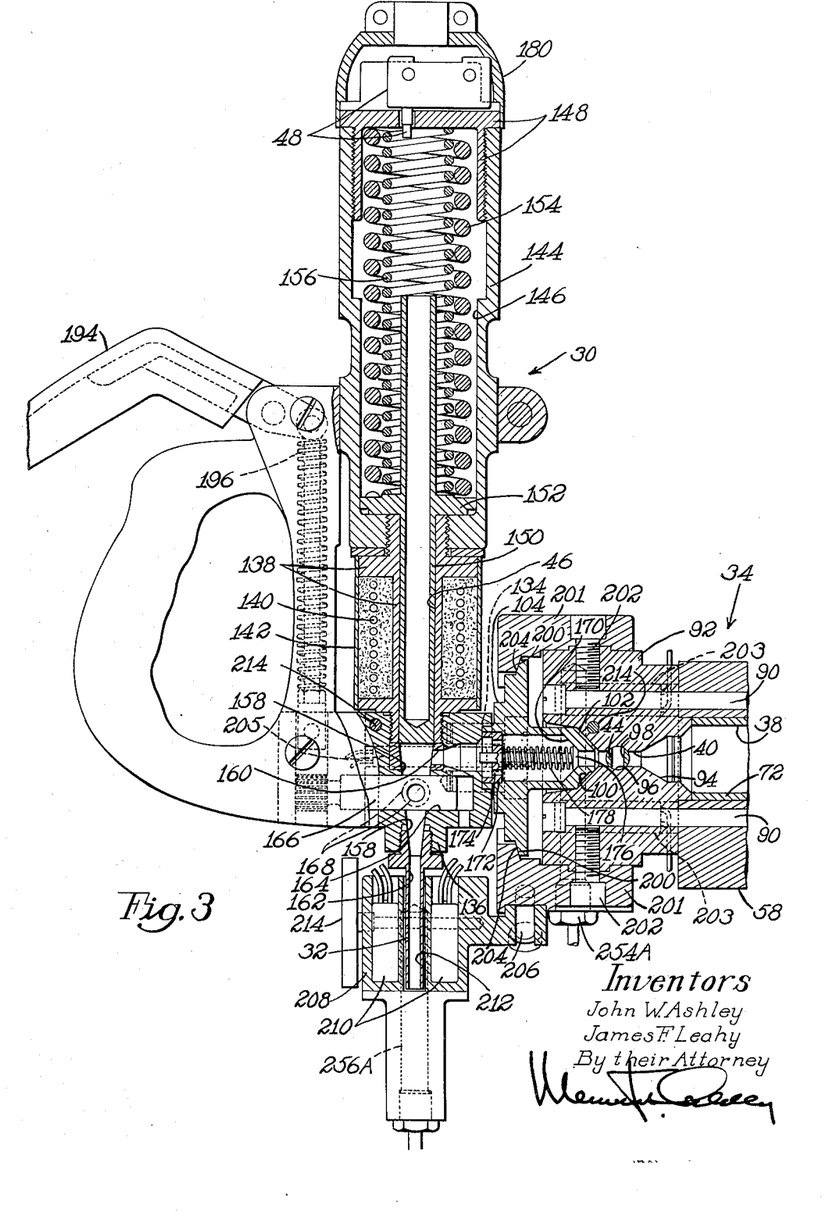
Figure 3A:
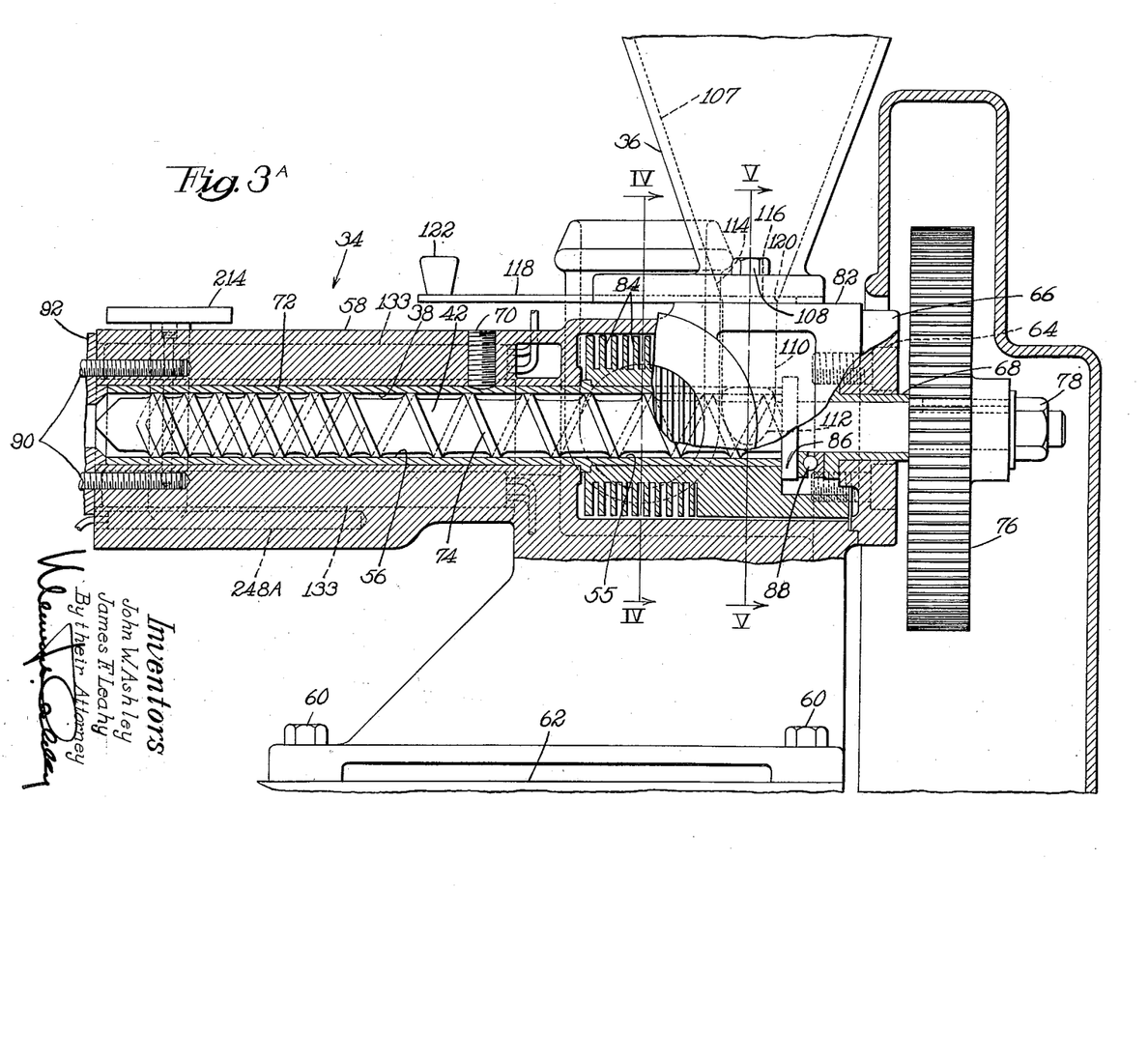
Figures 4, 5, 10, 11:
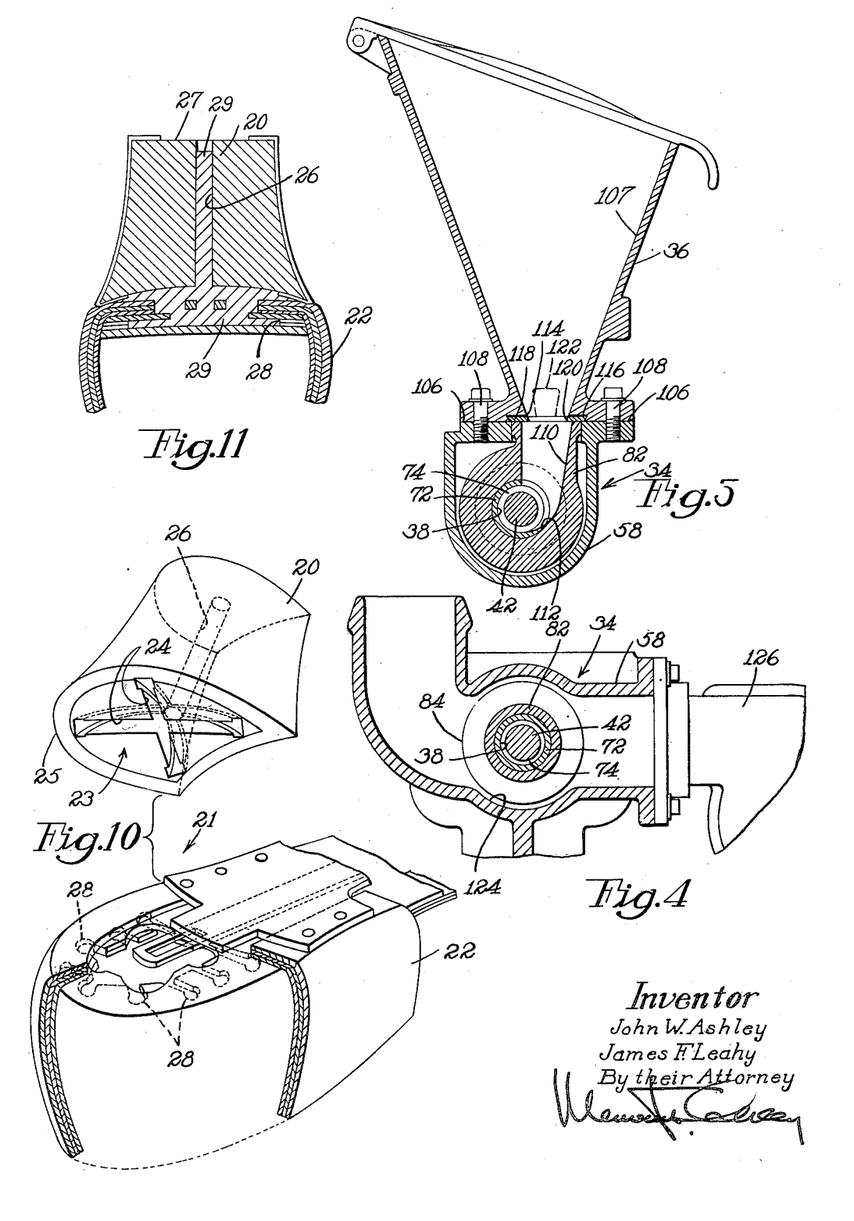
Figs. 4 and 5 are sections on lines IV—IV and V—V of Fig. 3A.
Fig. 10 is an exploded view showing partly in section and partly broken away the rear end of a shoe and showing a heel which is to be attached to the shoe by the use of the extruder injector combination.
Fig. 11 is a transverse section through the heel seat of the shoe and the heel after the heel has been attached by resin to the shoe.

The gun 30 may be forced into and held as shown in Fig. 3 in interlocking or coupled resin receiving position upon the extruder 34 with the conical face 102 of its coupling portion 104 in forced engagement with the frusto conical face 100 of the extruder block 92, by the provision of spiral cam faces 200 which are formed on upper and lower brackets 201 secured by screws 202 to the block 92 and are engaged by spiral faces 204 of the coupling portion 104 of the gun 30 as said gun is mounted upon the extruder 34 as disclosed in detail in said application Serial No. 43,046.

The temperature of the resin in the gun 30 should be high enough to insure that said gun shall quickly and effectively inject the resin into the work. Accordingly the extruder block 92 has four electric heaters 203 inserted in it and two electric heaters 205 are inserted in the valve block 196 of the gun 30. It is important that the nozzle 32 of the gun 30 shall be kept hot while the gun is not in use. Accordingly there is secured by screws 206 (only one shown) to the extruder 34 a shroud 208 which is heated by two electric heaters 210 and has formed in it a slot 212 in which the nozzle of the gun 30 is positioned when the gun 30 is coupled to the extruder 34. In order that the operator may at a glance determine the temperature in the iron casting 58 and the end block 92 of the extruder 34 as well as in the valve block 136 of the gun and in the shroud 208 there are provided thermometers 214 having stems which fit in recesses of the various members.

Figure 8:
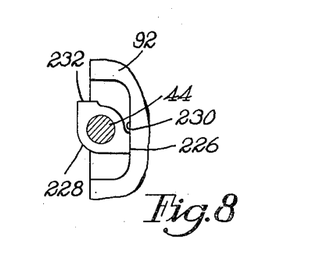
Fig. 8 is a view on line VIII of Fig. 6 showing in detail a limit stop used in combination with said valve actuating mechanism.

The valve 44 has pinned to its outer end a lever 216 (Figs. 1, 2, 6 and 7) one end of which is secured to a spring 218 and the other end of which is pivotally connected to an arm 220 of the solenoid 52. The spring 218 which has one of its end attached to a post 224 secured to the table 62 constantly urges the valve 44 counterclockwise as viewed in Fig. 7 for holding the valve closed when the solenoid 222 is deenergized, a face 226 (Fig. 8) of a positioning lever 228 secured to the valve at such time being in engagement with a face 230 of the extruder end block 92. When the machine has been brought up to the proper temperature for operation and the start switch 190 has been actuated the solenoid 52 is energized causing the valve 44 to be rotated clockwise by the solenoid against the action of the spring 218 to its active position in which the passage 98 of the valve is in alinement with the outlet port 40 in the extruder end block 92 thereby enabling the plasticized resin to flow from the extruder 34 into the gun 30, the active or open position of the valve being controlled by the engagement of a shoulder 232 of the lever 228 with the face 230 of said block.

Assuming that the machine is "cold" the operator closes the main or power switch 123 (Figs. 2 and 9) causing current to pass through a coil 236 of a relay 238 to close said relay with the result that the blower motor 128 is started and the coil 132 of a relay 240 is energized causing switch bars of the relay to bridge contacts 242 for activating the heaters 133 of the iron casting 58 of the extruder. At the same time the heaters 203, 210 and 205, 140 in the end block 92, the shroud 208 and the gun 30 respectively are energized and a line power light 244 (Figs. 1, 2 and 9) and "heat on" lights 246 associated with the valve heaters are simultaneously lighted.

The operator then waits until the heat of the iron casting 58 of the extruder 34 is raised to a predetermined temperature determined by setting of a thermostat 248 (Figs. 1 and 9) which normally engages a contact 250 (Fig. 9) in a circuit 252 including the coil 132. It will be noted that the heaters 203, 210 are normally set to insure that the temperature in the extruder end block 92 and the shroud 208 (Figs. 1 and 3) shall be greater than the temperature in the iron casting 58, thermostats 254, 256 (Figs. 1, 2, 3 and 9) being arranged in the circuits of said heaters for shutting off said heaters when the proper temperatures have been reached. The heaters 133, 203, 210 and 140, 205 have associated with them a variable transformer 258 which may be manually set to maintain a predetermined sustaining heat in the extruder casting 58, the end block 92, the shroud 208 and the gun 30 which have been initially brought up to the desired temperature by the heaters initially operating under normal line voltage.

When the iron casting 58 of the extruder 34 reaches a predetermined temperature the thermostat 248 moves out of engagement with the contact 250 thus deenergizing the coil 132 and causing bars of the relay 240 to move away from associated contacts 242 thereby cutting the current from the casting heaters 133. When the heaters 203, 210 of the extruder end block 92 and the shroud 208 have been raised to the proper predetermined temperatures, contacts of the thermostats 254, 256 move away from contacts 260, 262 respectively thus cutting the current to said heaters 203, 210. It will be noted that current is constantly supplied to the gun heaters 140, 205, the operator changing the initial as well as the sustaining temperature of the resin in said gun by adjusting a variable transformer 264.

When the heaters 133 have been raised to the desired temperature a contact of the thermostat 248 engages a contact 266 of a circuit 268 causing a "ready light" 270 to be lit. It will be clear that the lights 246 of the various heaters will be flashing off and on depending upon whether the thermostats 248, 254 and 256 respectively are in positions to cause current to be supplied to the heaters. When the thermostat 248 engages the contact 266 a coil 272 of a relay 274 is energized and bars 276, 277 of said relay move across contacts 278, 279 respectively and another bar 280 of the relay moves away from contacts 282 thus changing the path of flow of the current.

It will be noted that a circuit 284 which includes the contacts 279 also includes in it the gun limit microswitch 48 and a manually operated stop switch 286 which is arranged at the front of the extruder and may be manually actuated to stop in an emergency the screw conveyor 42. Illumination of the light 270 indicates that the temperature in the extruder is suitable to start operations and the operator if he desires to operate the extruder presses the normally open switch 190 in the circuit 284 causing the coil 184 of the relay 186 to move switch bars 290 of the relay across contacts 292 in the circuit 188 for starting the conveyor motor 50 and to move the switch bar 195 across the terminals 193 to energize the holding circuit 192. The closing of the normally open start switch 190 also energizes a coil 294 of the solenoid 52 to open the valve 44 against the action of the spring 218. In view of the fact that the switch 190 is normally open the above described holding circuit 192 is provided to maintain the motor 50 in operation and the solenoid 52 energized after said switch has been released.

The gun 30 is commonly in its position shown in Fig. 3 when the starting switch 190 is pressed, the plasticized resin flowing through the various passages and conduits above described into the chamber 46 of the gun. When the chamber 46 has been filled the upper end of the plunger 150 engages the microswitch 48 with the result that the solenoid coil 294 is deenergized causing the valve 44 under the action of the spring 218 to move to its closed position and the solenoid 184 is deenergized to open the relay 186 with the result that the conveyor operating motor 50 stops.

When the thermostat 248 has been moved into engagement with the contact 266 after the extruder has been raised to the desired predetermined temperature the coil 272 is energized and the bars 276, 277 bridge the contacts 278, 279 while the bar 280 moves away from the contacts 279 with the result that the current passes to the variable transformer 258 through a different circuit to lower the voltage in the circuits supplying current to the heaters 133, 203, 210 and 140, 205. After the machine has been brought up to heat the voltage, setting of the variable transformer 258 is sufficient to maintain a substantially sustained heat in the various heaters. It will be noted that the variable transformer 258 automatically reduces the current supplied to the gun 30, the amount of current supplied to the gun being further regulated manually in accordance with the desired condition of the resin in the injector by the use of the variable transformer 264.

Having thus described our invention, what we claim as new and desire to secure by Letters Patent of the United States is:

1. An extruder comprising a resin receiving section and a resin plasticizing section, units for heating said plasticizing section, air circulating means for cooling said receiving section, a conveyor for advancing resin through said receiving and plasticizing sections, registering means responsive to the temperature of the resin in the plasticizing section, mechanism for operating said conveyor, and means for rendering said mechanism inactive until the temperature of the resin in the plasticizing section as registered by said second-named means has attained a predetermined degree.

2. An extruder comprising a resin receiving section and a resin plasticizing section, electric heating units for rapidly raising the temperature of the resin in the plasticizing section to a predetermined degree and for thereafter maintaining approximately said degree of temperature, air circulating means for cooling said resin receiving section, a conveyor for advancing resin through said receiving and plasticizing sections of the extruder, means for measuring the temperature of the resin in said plasticizing sections, mechanism for operating the conveyor, means for insuring against said mechanism being rendered active until the temperature of the resin in the plasticizer has attained a predetermined degree, and means for automatically rendering inactive the electric heating units and said mechanism in response to failure of said air circulating means.

3. In a combination for use in the manufacture of shoes, an injector, an extruder having an air cooled section into which powdered resin is fed and a heated section in which powdered resin received from said cooled section is plasticized, units for heating said heated section, a conveyor for feeding said resin through said sections of the extruder, a passage through which the plasticized resin is forced from the heated section of the extruder, means for coupling the injector to the extruder to conduct into the injector plasticized resin forced through said passage, means for applying heat to said heated section and for automatically reducing the heat supplied to said heated section after the heated section has attained a predetermined temperature, means comprising a limit switch for stopping said conveyor when the injector has received a predetermined quantity of resin from the extruder, manually operated means for rendering said mechanism active to operate said conveyor, a valve operated in said passage, means for opening said valve and for maintaining it open when the conveyor is being operated and for maintaining it closed when the conveyor is stopped, means for circulating air around said cooling section of the extruder, and means for stopping the conveyor and for rendering said units inactive when ever the air circulating means is inactive.

4. An extruder comprising iron and aluminum castings respectively, the tube having resin receiving and plasticizing sections mounted in and extending through said castings, a screw conveyor rotatably mounted in said tube, registering passages formed in the aluminum casting and the receiving section of the tube, a hopper which is secured in said iron casting and has a resin receiving pocket in register with the passage in the aluminum casting, an air conduit formed in said iron casting, said aluminum casting having a plurality of fins positioned in said air conduit, a fan for circulating air through said conduit, means for rotating said conveyor to feed powdered resin received from the hopper through the resin receiving and plasticizing sections of said tube, and means for heating the iron casting to cause said powdered resin forced through the receiving and plasticizing sections of the tube to be heated to a predetermined temperature.

5. The combination of an injector comprising a coupling having an intake conduit, an extruder provided with an output conduit which is constructed and arranged to interfit with the conduit of the injector coupling, said coupling and extruder having spiral cams respectively and sealing portions respectively which are complemental to each other, the construction and arrangement of the spiral cams, the conduits and the conduit sealing portions of the injector coupling and the extruder head being such that rotation of the injector with its spiral cam in engagement with the spiral cam of the extruder causes the sealing portion of the injector coupling to be forced into engagement with the sealing portion of the extruder, a valve seat located in said intake conduit of the injector coupling, a spring, a slidable valve movable to an ineffective position in the valve seat under pressure in the extruder and into an effective position in engagement with said valve seat under the pressure of said spring and the pressure of viscous resin in the injector.

JOHN W. ASHLEY.
JAMES F. LEAHY.

REFERENCES CITED

The following references are of record in the file of this patent:

UNITED STATES PATENTS

| Number | Name | Date |
| --- | --- | --- |
| 2,372,833 | Jobst | Apr. 3, 1945 |
| 2,402,805 | Cousino | June 25, 1946 |
| 2,487,426 | Cousino | Nov. 8, 1949 |